(12) United States Patent
Allen et al.

(10) Patent No.: US 8,833,805 B2
(45) Date of Patent: Sep. 16, 2014

(54) PORTABLE ELECTRONIC DEVICE WITH BATTERY COVER AND LOCKING MECHANISM THEREFOR

(75) Inventors: Aaron Robert Allen, Pembroke Pines, FL (US); Paul Brian Koch, Plantation, FL (US); Douglas Wayne Moskowitz, Weston, FL (US); Jean-Charles Mas, Sunrise, FL (US)

(73) Assignee: BlackBerry Limited, Waterloo (CA)

( * ) Notice: Subject to any disclaimer, the term of this patent is extended or adjusted under 35 U.S.C. 154(b) by 384 days.

(21) Appl. No.: 13/018,991

(22) Filed: Feb. 1, 2011

(65) Prior Publication Data

US 2011/0200859 A1 Aug. 18, 2011

Related U.S. Application Data

(60) Provisional application No. 61/304,577, filed on Feb. 15, 2010.

(51) Int. Cl.
*E05C 19/00* (2006.01)
*H04M 1/02* (2006.01)

(52) U.S. Cl.
CPC .......... *H04M 1/0235* (2013.01); *H04M 1/0252* (2013.01); *H04M 1/0262* (2013.01); *Y10S 292/11* (2013.01)
USPC ...... 292/1; 292/DIG. 11; 429/163; 455/575.1

(58) Field of Classification Search
USPC ............. 292/1, DIG. 11; 379/433.11, 433.08; 429/163, 97, 100, 121, 96; 455/575.1, 455/550.1, 90.3
See application file for complete search history.

(56) References Cited

U.S. PATENT DOCUMENTS

| 6,563,927 B2 | 5/2003 | Mote et al. |
| 6,997,635 B2 | 2/2006 | Liu et al. |
| 7,477,737 B2 | 1/2009 | Shiogama |

(Continued)

FOREIGN PATENT DOCUMENTS

| EP | 1933537 A1 | 6/2008 |
| EP | 1990980 A1 | 12/2008 |
| JP | 2008263490 A | * 10/2008 |

OTHER PUBLICATIONS

Extended European search report issued May 18, 2011 in respect of corresponding European Application No. 11152928.5.

(Continued)

*Primary Examiner* — Mark Williams
(74) *Attorney, Agent, or Firm* — Novak Druce Connolly Bove + Quigg LLP

(57) ABSTRACT

A portable electronic device comprises a lower housing including a battery compartment. An upper housing is coupled to the lower housing and is slidable relative thereto in a first linear direction between a closed position and an open position. A battery cover is configured to engage the lower housing and move generally in the first linear direction relative to the lower housing from an unlatched position to a latched position in which the battery cover interlocks with the lower housing and encloses the battery compartment. The battery cover may comprise at least one of a post element or a beam element and the lower housing may comprise at least one of the other of the post element or the beam element. The post and beam elements are configured to interlock with one another when the battery cover is in the latched position.

11 Claims, 8 Drawing Sheets

(56) References Cited

U.S. PATENT DOCUMENTS

| | | | |
|---|---|---|---|
| 8,010,170 B2* | 8/2011 | Shi et al. | 455/575.1 |
| 8,409,738 B2* | 4/2013 | Ouyang | 429/97 |
| 2008/0084994 A1 | 4/2008 | Chuang | |
| 2008/0193837 A1* | 8/2008 | Lu | 429/163 |
| 2009/0291722 A1 | 11/2009 | Li et al. | |
| 2010/0216003 A1* | 8/2010 | Ouyang | 429/97 |

OTHER PUBLICATIONS

Examination Report mailed Dec. 22, 2011, in corresponding European patent application No. 11152928.5.

Office Action mailed Oct. 19, 2012, in corresponding Canadian patent application No. 2,730,825.

* cited by examiner

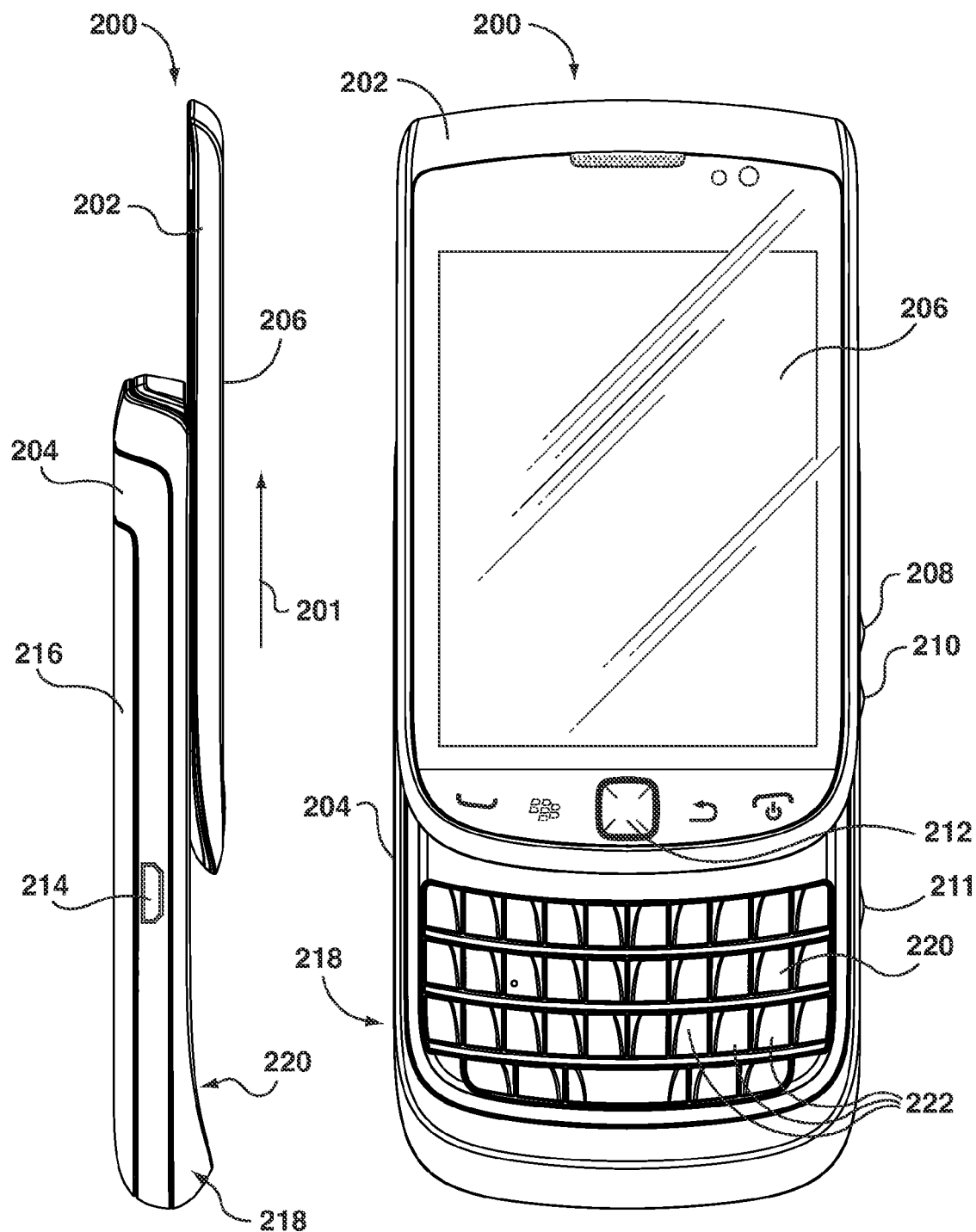

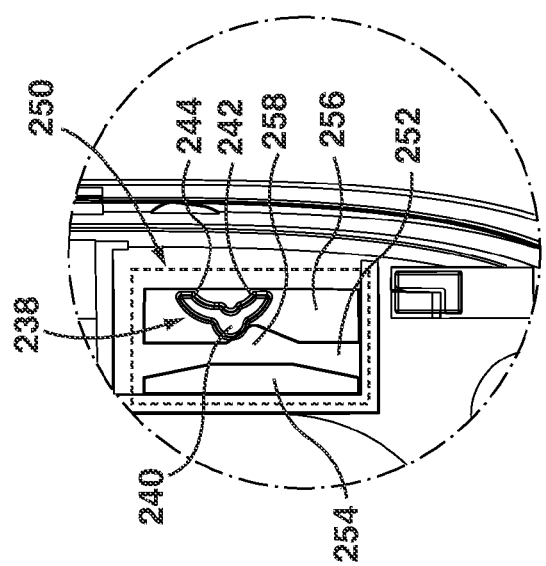
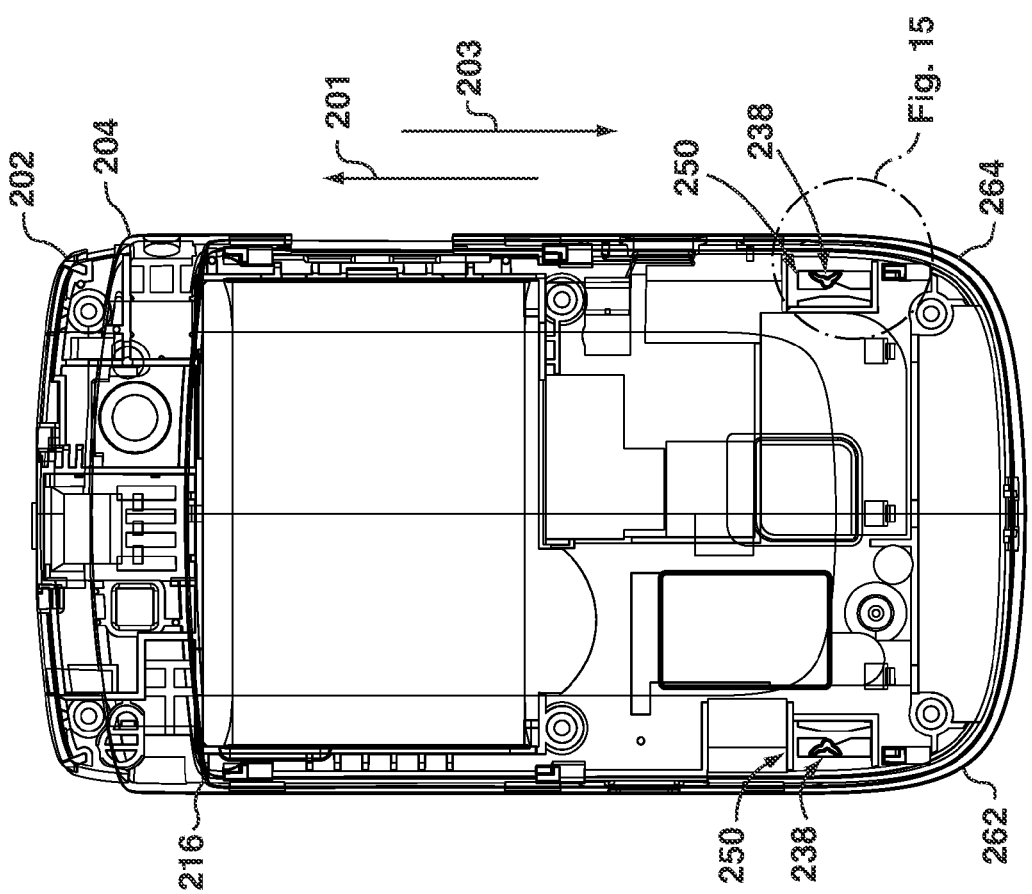

PORTABLE ELECTRONIC DEVICE WITH BATTERY COVER AND LOCKING MECHANISM THEREFOR

CROSS-REFERENCE TO RELATED APPLICATION

This application claims priority to U.S. Provisional Application No. 61/304,577 filed on Feb. 15, 2010 and entitled PORTABLE ELECTRONIC DEVICE WITH BATTERY COVER AND LOCKING MECHANISM THEREFOR, the entire contents of which are hereby incorporated herein by reference.

FIELD OF TECHNOLOGY

The present disclosure relates to portable electronic devices, and in particular to portable electronic devices having an upper housing slidable relative to a lower housing.

BACKGROUND

Electronic devices, including portable electronic devices, have gained widespread use and may provide a variety of functions including, for example, telephonic, electronic text messaging and other personal information manager (PIM) application functions. Portable electronic devices can include several types of devices including mobile stations such as simple cellular phones, smart phones, Personal Digital Assistants (PDAs), and laptop computers.

Devices such as PDAs or smart phones are generally intended for handheld use and ease of portability. Smaller devices are generally desirable for portability. Smaller portable electronic devices are available in various constructions, including unibody designs, "clamshell" or "flip-phone" styles and "slider" phones.

BRIEF DESCRIPTION OF THE DRAWINGS

Embodiments of the present disclosure will now be described, by way of example only, with reference to the attached Figures, wherein:

FIG. 6 is a first side view of the portable electronic device of FIG. 2 shown in an open position;

FIG. 7 is a front view of the portable electronic device of FIG. 6;

FIG. 14 is a back, see-through view of the battery cover of FIG. 10 in a latched position installed onto the lower housing of FIG. 12; and FIG. 15 is a detailed view of FIG. 14.

DETAILED DESCRIPTION

Figure 1:
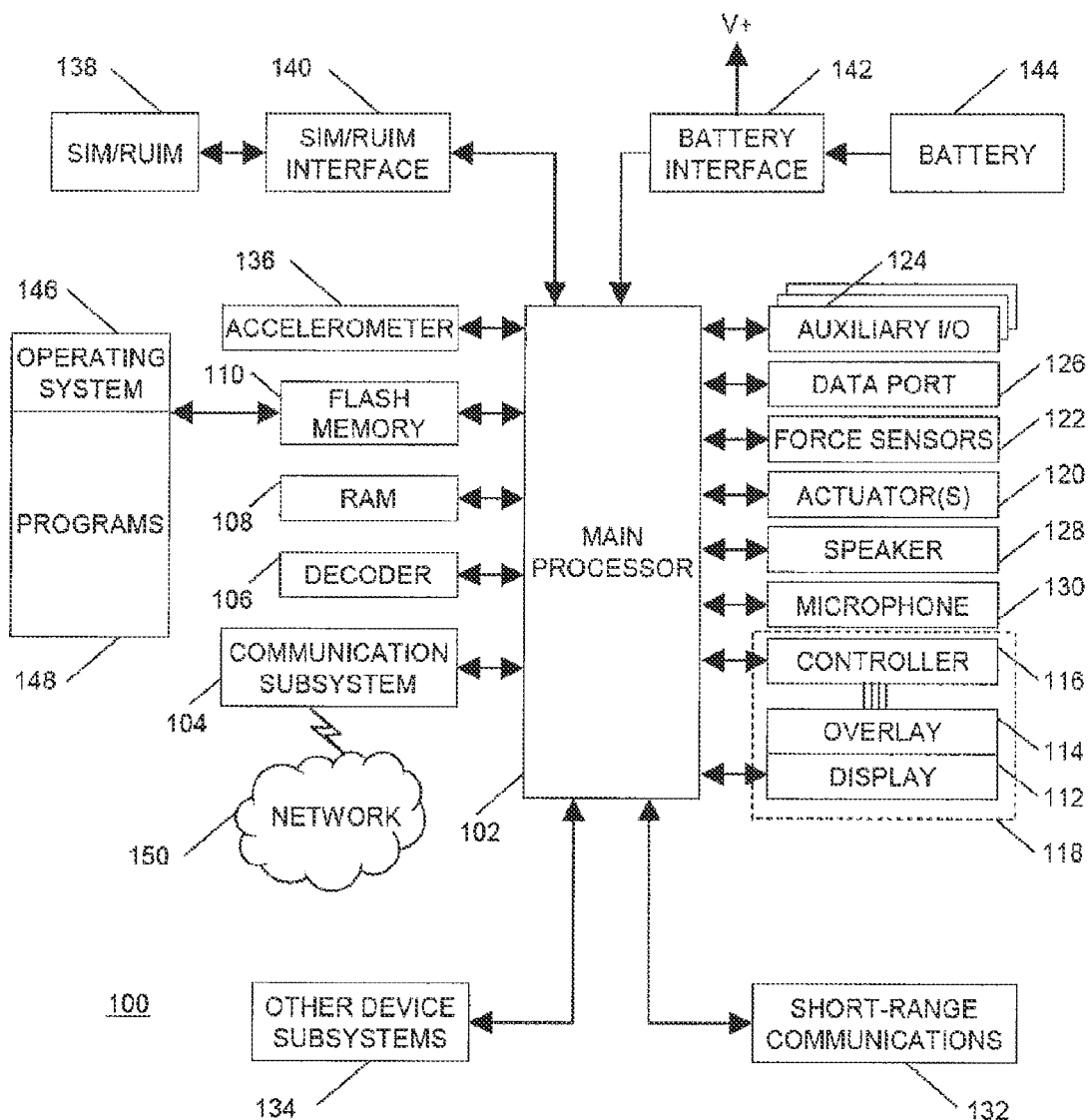
FIG. 1 is a simplified block diagram of components including internal components of a portable electronic device according to an example.

The following describes a portable electronic device that includes a lower housing and an upper housing slidable relative to the lower housing between closed and open positions. A battery cover is configured to interlock with the lower housing and enclose a battery compartment in the lower housing.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limited to the scope of the example embodiments described herein.

FIG. 1 shows a simplified block diagram of components including internal components of a portable electronic device 100 according to one embodiment. FIG. 1 is exemplary only, and those persons skilled in the art will appreciate the additional elements and modifications necessary to make the portable electronic device 100 work in particular network environments.

The portable electronic device 100 includes multiple components such as a processor 102 that controls the operations of the portable electronic device 100. Communication functions, including data communications, voice communications, or both can be performed through a communication subsystem 104. Data received by the portable electronic device 100 is decompressed and decrypted by a decoder 106. The communication subsystem 104 receives messages from and sends messages to a wireless network 150.

The wireless network 150 can be any type of wireless network, including, but not limited to, data-centric wireless networks, voice-centric wireless networks, and dual-mode networks that support both voice and data communications over the same physical base stations.

The portable electronic device 100 can be a battery-powered device and as shown includes a battery interface 142 for receiving one or more rechargeable batteries 144.

The processor 102 also interacts with additional subsystems such as a Random Access Memory (RAM) 108, a flash memory 110, a display 112 with a touch-sensitive overlay 114 connected to an electronic controller 116 that together comprise a touch-sensitive display 118, an actuator assembly 120, one or more optional force sensors 122, an auxiliary input/output (I/O) subsystem 124, a data port 126, a speaker 128, a microphone 130, short-range communications 132 and other device subsystems 134.

User-interaction with the graphical user interface can be performed through the touch-sensitive overlay 114. The processor 102 interacts with the touch-sensitive overlay 114 via the electronic controller 116. Information, such as text, characters, symbols, images, icons, and other items that can be displayed or rendered on a portable electronic device, is displayed on the touch-sensitive display 118 via the processor 102.

The processor 102 can also interact with an accelerometer 136 as shown in FIG. 1. The accelerometer 136 can include a cantilever beam with a proof mass and suitable deflection sensing circuitry. The accelerometer 136 can be utilized for detecting direction of gravitational forces or gravity-induced reaction forces.

To identify a subscriber for network access according to the present embodiment, the portable electronic device 100 can use a Subscriber Identity Module or a Removable User Identity Module (SIM/RUIM) card 138 inserted into a SIM/RUIM interface 140 for communication with a network such as the wireless network 150.

Alternatively, user identification information can be programmed into the flash memory 110.

The portable electronic device 100 also includes an operating system 146 and software components 148 that are executed by the processor 102 and which can be stored in a persistent store such as the flash memory 110. Additional applications can be loaded onto the portable electronic device 100 through the wireless network 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber can also compose data items, such as e-mail messages, for example, which can be transmitted over the wireless network 150 through the communication subsystem 104.

For voice communications, the overall operation of the portable electronic device 100 is similar. The speaker 128 outputs audible information converted from electrical signals, and the microphone 130 converts audible information into electrical signals for processing.

Figures 2, 3:
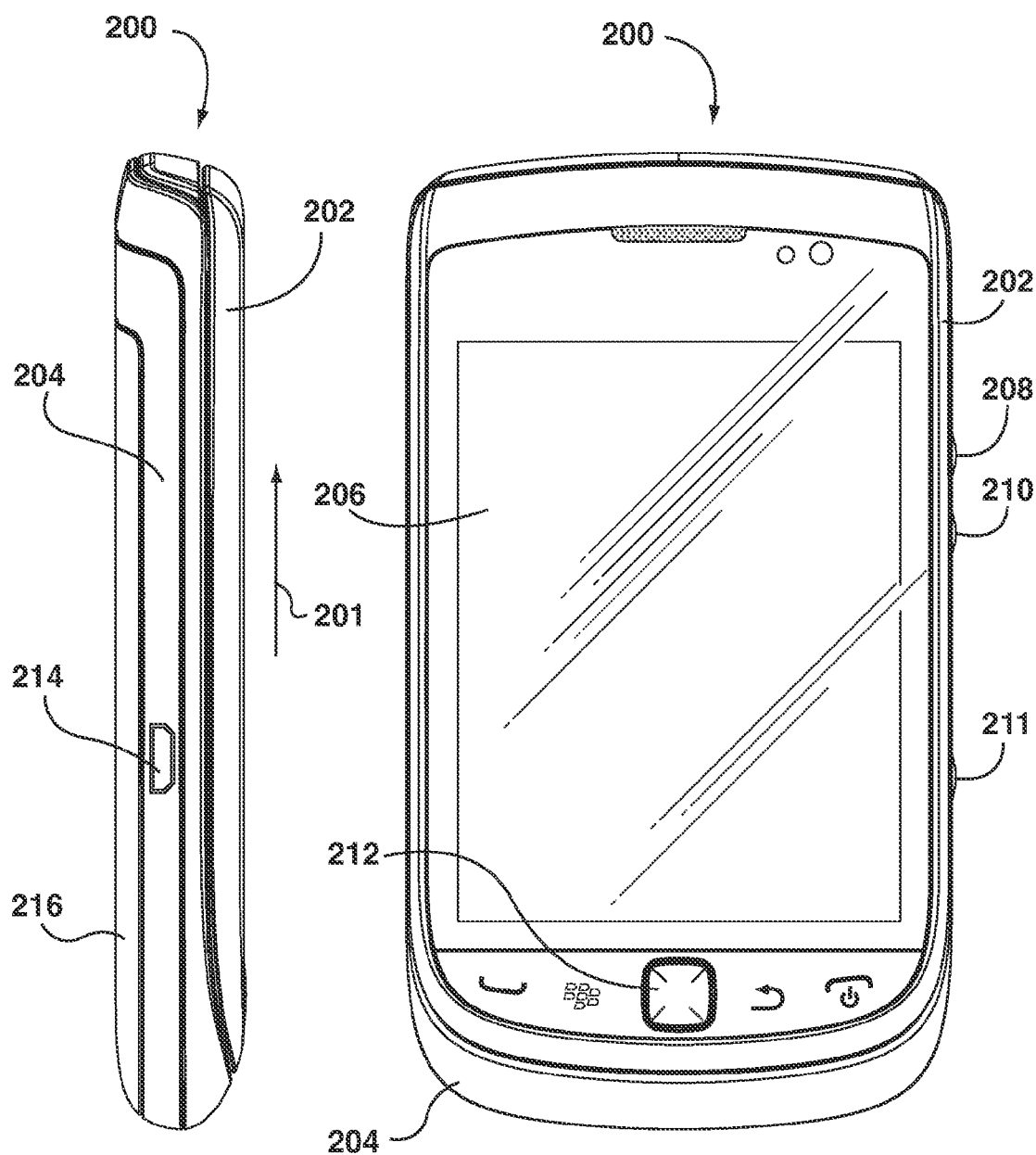
FIG. 2 is a first side view of a portable electronic device according to an example shown in a closed position.
FIG. 3 is a front view of the portable electronic device of FIG. 2.
Figures 4, 5:
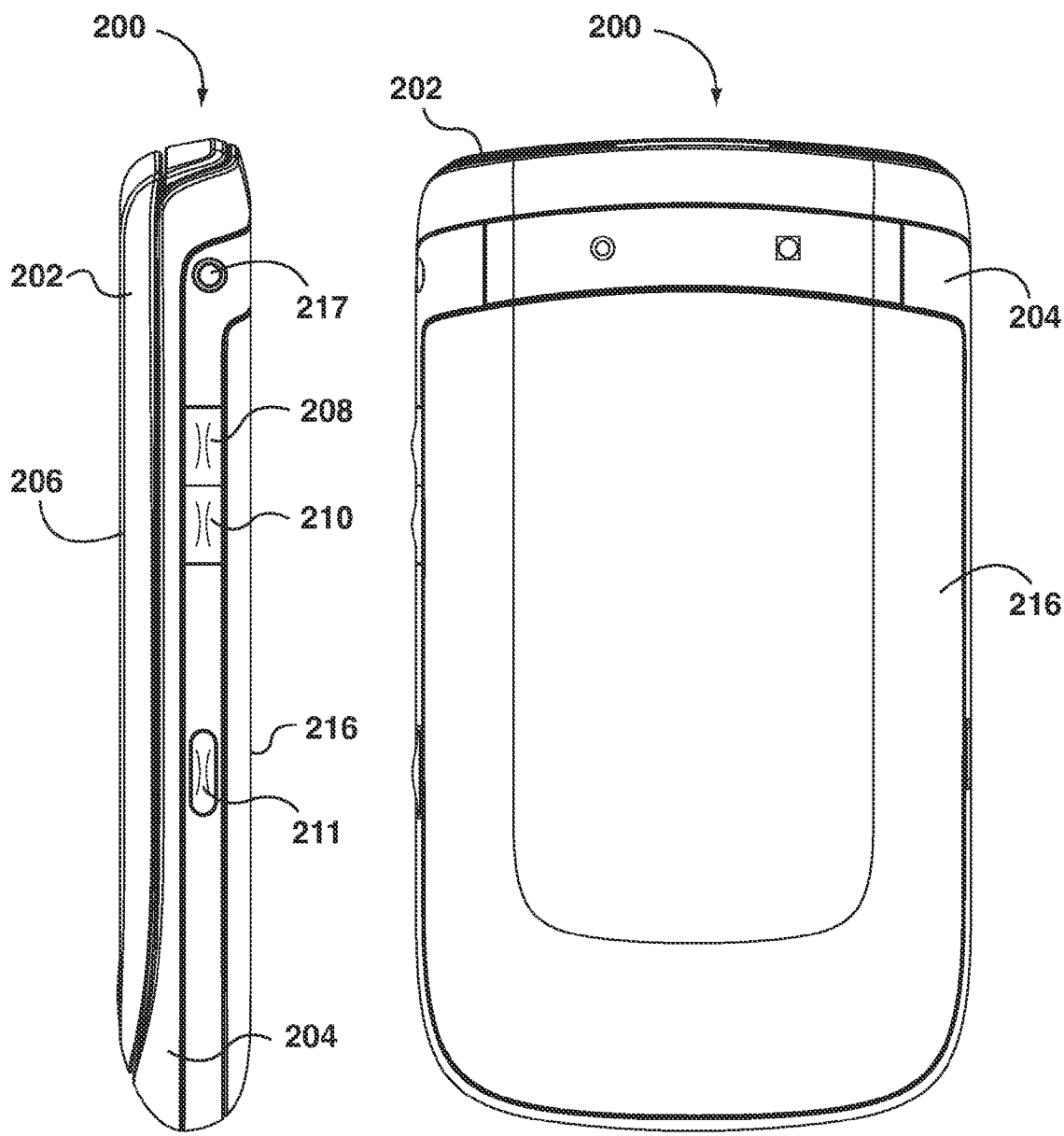
FIG. 4 is a second side view of the portable electronic device of FIG. 2.
FIG. 5 is a back view of the portable electronic device of FIG. 2.
Figure 8:
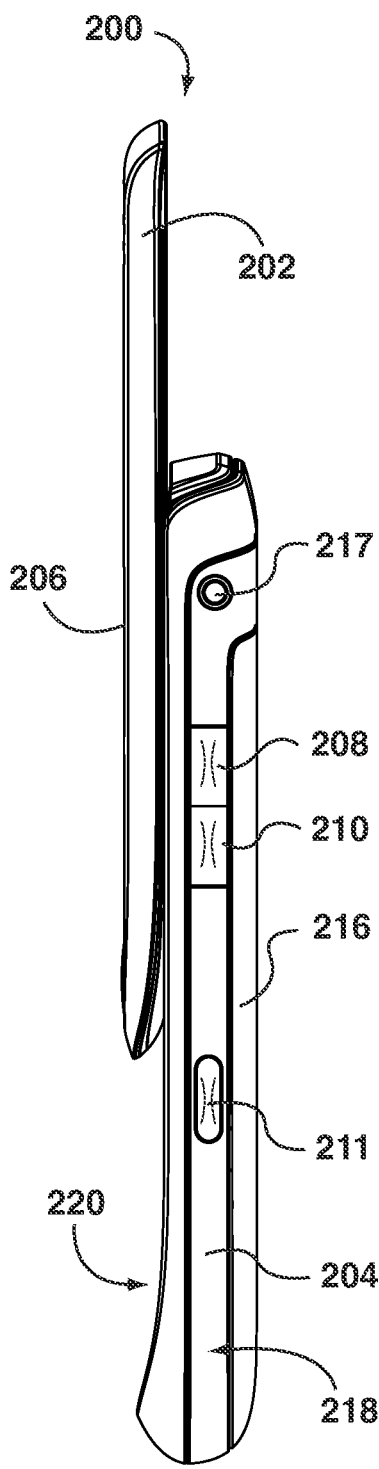
FIG. 8 is a second side view of the portable electronic device of FIG. 6.
Figure 9:
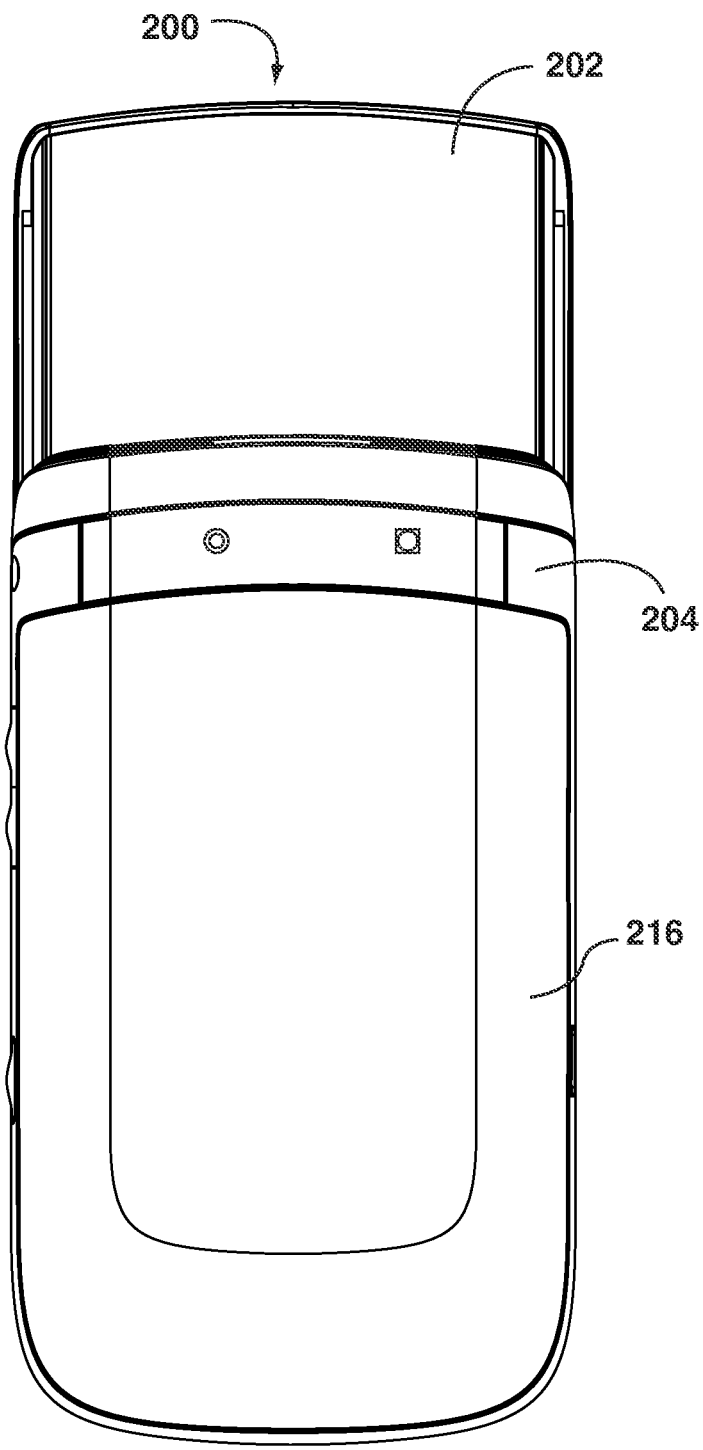
FIG. 9 is a back view of the portable electronic device of FIG. 6.

Turning now to FIGS. 2 to 9, illustrated generally therein is a portable electronic device 200 according to one example. The portable electronic device 200 is commonly referred to as a "slider" style device and includes an upper housing 202 (or sliding portion) and a rear, lower housing 204 (or base portion). The upper housing 202 and lower housing 204 are coupled together, and the upper housing 202 is slidable relative to the lower housing 204 in a first linear direction 201 between a closed position (e.g., as shown in FIG. 2) and an open position (e.g., as shown in FIG. 6).

In some embodiments, and as shown, the portable electronic device 200 is generally taller than it is wide. In such embodiments, the first linear direction 201 is generally parallel to a longitudinal axis of the portable electronic device 200. Thus, as the portable electronic device 200 moves between the closed and open positions, the upper housing 202 is moving relative to the lower housing 204 generally parallel to the longitudinal axis of the portable electronic device 200.

As shown, a front of the upper housing 202 includes a display 206, which can be an LCD display. Optionally, in some examples, the display 206 can be a touch-sensitive display.

As shown, both of the upper housing 202 and lower housing 204 can include input apparatuses.

The upper housing 202 can include an auxiliary input device 212 that responds to user interaction, and which can be used for navigating around the display 206, to select objects on the display 206, or for other purposes. The auxiliary input device 212 can act as a cursor navigational tool and can be exteriorly located upon a front of the upper housing 202. The front location of the auxiliary input device 212 is advantageous because it makes the tool easily thumb-actuatable when the device is in both the open and closed positions.

The upper housing 202 can also include other input devices, such as a dedicated phone application button, a dedicated "disconnect call" button, a home screen button, etc. In various embodiments, these input devices include optical sensors, mechanical buttons, or both.

Turning now to the lower housing 204, the lower housing 204 can include various buttons and other controls, such as buttons 208 and 210, and which could be used for navigation, to control volume or for other purposes.

The lower housing 204 could also include one or more application buttons 211 that can be used to automatically launch a particular application on the portable electronic device 200 (e.g., a camera application, a phone application, etc.). In some embodiments, the button 211 can be configurable by a user (e.g., the user can be able to select the particular application launched by the button 211).

As shown in FIGS. 2 and 6, the lower housing 204 could also include one or more input or output ports (e.g., I/O ports), such as a microUSB port 214. In some examples, the port 214 can be used for data communication with the portable electronic device 200, for charging of a battery (not shown) on the device 200 or for both.

As shown, the lower housing 204 also includes a battery cover 216 for enclosing the battery (not shown), which is described in further detail below.

In some embodiments, the lower housing 204 can also include an audio jack 217. The audio jack 217 can be used to couple the portable electronic device 200 to a speaker, a microphone, or both, for example for use in voice communication.

Turning now to FIGS. 6 to 9, as shown when the portable electronic device 200 is in the open position, a keypad 220 is exposed on a lower portion 218 of the lower housing 204. The keypad 220 generally includes a plurality of alphanumeric keys 222, which can be positioned in a plurality of rows and columns. In some embodiments, the keys 222 can represent the alphabet and can be arranged with a standard keyboard layout (e.g., QWERTY, QWERTZ, DVORAK, etc.).

As shown in FIGS. 2 to 5, when the portable electronic device 200 is in the closed position, the keypad 220 is covered by the upper housing 202. This can be beneficial as it can protect the keypad 220 when not in use, and can also inhibit keys from being pressed inadvertently when the user is carrying the portable electronic device 200 (e.g., in a pocket). However, the user can perform functions on the portable electronic device 200 while closed by interacting with the display 206, along with the buttons 208, 210, 211, and the auxiliary input device 212. As mentioned above, the display 206 and the auxiliary input device 212 are generally disposed on a front of the upper housing 202 and exposed for user accessibility when the portable electronic device 200 is in either of the open or closed positions.

When the portable electronic device 200 is in the open position (as shown in FIGS. 6 to 9), the keypad 220 is exposed for user accessibility. Furthermore, auxiliary input device 212 is disposed near a bottom side of the upper housing 202 so that, when in the open position (as shown in FIGS. 6 to 9), the auxiliary input device 212 is arranged between the display 206 and the keypad 220. The arrangement of the auxiliary input device 212 between the display 206 and the keypad 220 can reduce interference during keyboarding and does not block the user's view of the display 206 during use, and provides for relatively short distances for a user's thumb to travel back and forth between the display 206, the auxiliary input device 212 and the keypad 220 during use.

Figure 11:
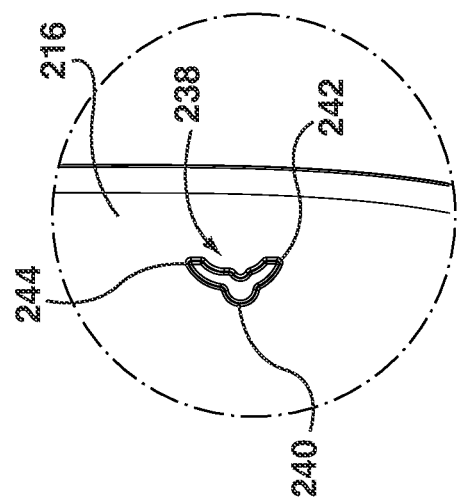
FIG. 11 is a detailed view of FIG. 10.
Figure 10:
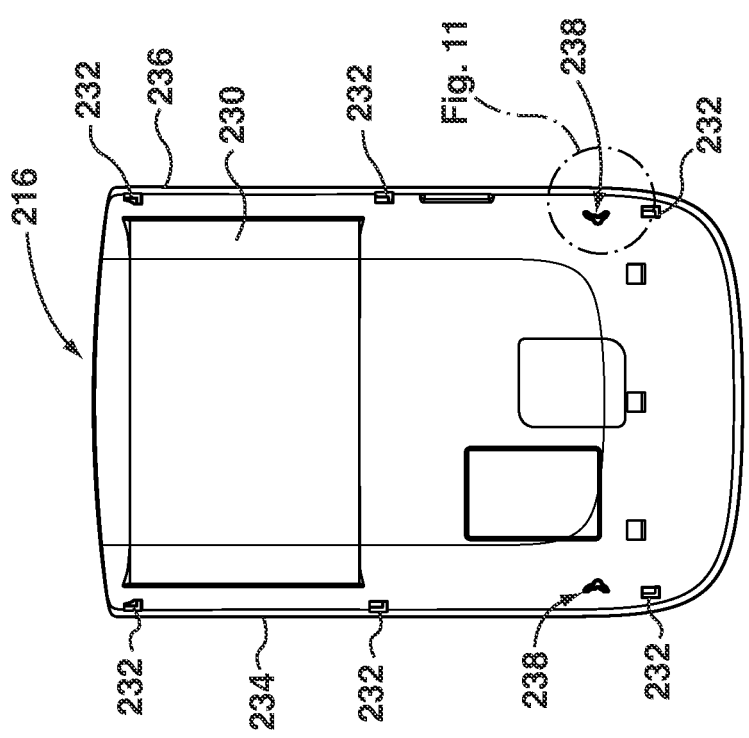
FIG. 10 is a front view of a battery cover of the portable electronic device of FIG. 2.

Referring to FIGS. 10 and 11, an interior surface 230 of the battery cover 216 can include a plurality of locking tabs 232 disposed generally along first and second lateral edges 234, 236. The battery cover 216 can also include, as shown, two post elements 238 that are raised relative to the interior surface 230, and also disposed generally along the first and second lateral edges 234, 236. As seen best in FIG. 11, each of the post elements 238 can include a central rounded portion 240, and side rounded portions 242, 244 adjoining the central rounded portion 240. The central rounded portion 240 faces generally inwardly, whereas the side rounded portions 242, 244 face generally outwardly toward the respective lateral side edge 234, 236. With the side rounded portions 242, 244, the post element 238 is a relatively rigid structure, with greater rigidity than, for example, a post with a circular cross section having similar cross sectional area.

Figure 13:
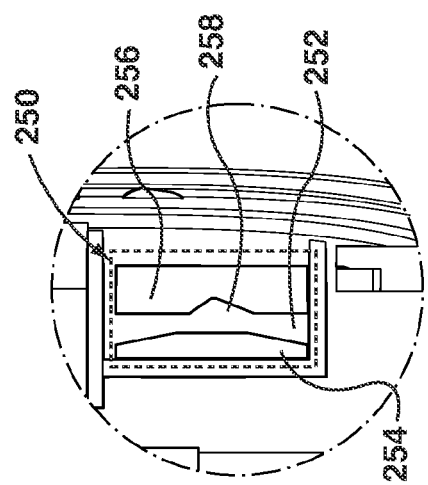
FIG. 13 is a detailed view of FIG. 12.
Figure 12:
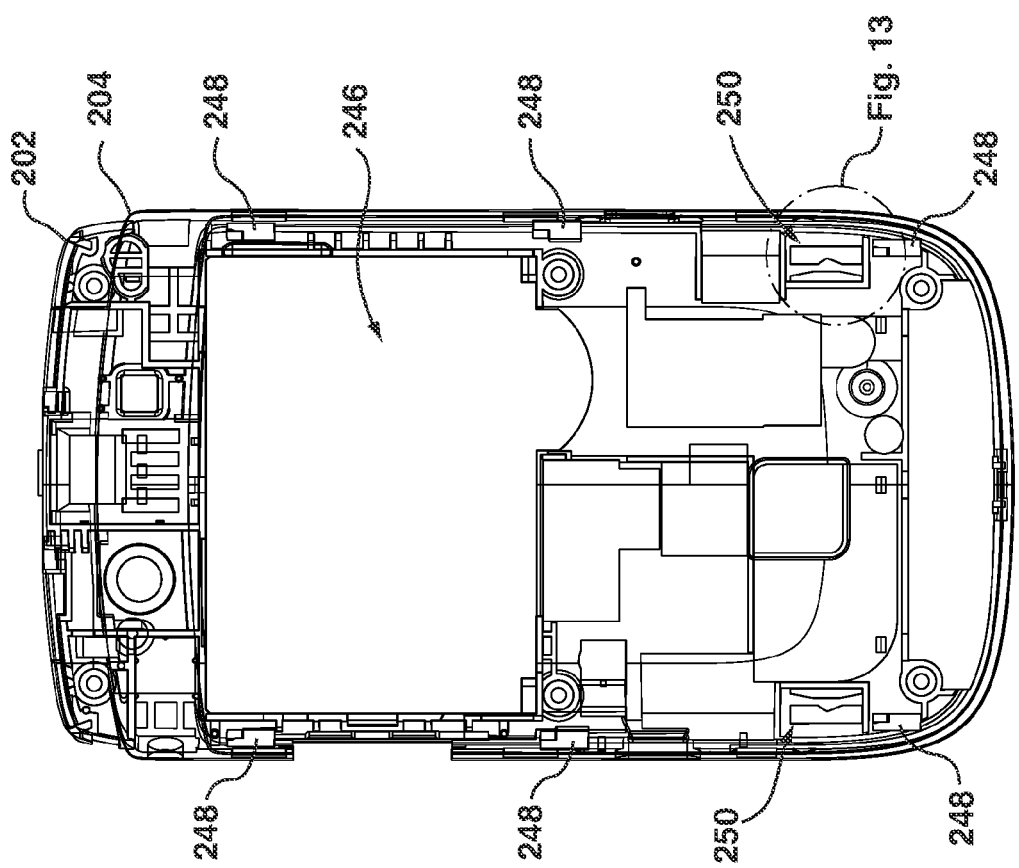
FIG. 12 is a back view of a lower housing of the portable electronic device of FIG. 2.

Referring to FIGS. 12 and 13, the lower housing 204 includes a battery compartment 246 for housing a battery (not shown), and a plurality of tab receiving slots 248 configured to receive and engage the locking tabs 232 of the battery cover 216. The lower housing 204 can include, as shown, two beam assemblies 250 arranged generally adjacent to opposing lateral sides of the lower housing 204. The beam assemblies 250 correspond to the post elements 238 of the battery cover 216. Each combination of the post element 238 and beam assembly 250 forms a locking mechanism for interlocking the battery cover 216 and the lower housing 204 to enclose the battery compartment 246. Each of the beam assemblies 250 can be unitarily formed, e.g., of plastic, and can include a resilient beam element 252 formed between a channel 254 and a post receiving channel 256. The beam element 252 can extend generally parallel to a longitudinal axis of the portable electronic device 200. A detent 258 is disposed outwardly on the beam element 252.

Referring to FIGS. 14 and 15, the battery cover 216 engages the lower housing 204, with each of the locking tabs 232 (see FIG. 10) received in respective tab receiving slots 248 (see FIG. 12). The battery cover 216 can be moved with tactile force generally in the first linear direction 201 relative to the lower housing 204 from an unlatched position to a latched position, as shown in FIG. 14. In the latched position, the battery cover 216 interlocks with the lower housing 204 and encloses the battery compartment 246 (see FIG. 12). The battery cover 216 can also be moved with tactile force in a second linear direction 203 relative to the lower housing 204 generally opposing the first linear direction 201 from the latched position to the unlatched position. Thus, the battery cover 216 can be moved to and from the latched position without a user-actuated button.

It should be appreciated that when the portable electronic device 200 is in a user's hand and in the open position, sliding the upper housing 202 to the closed position requires tactile force on the upper housing 202 (e.g., with the thumb) applied generally in the second linear direction 203, which in turn implies a tactile force on the battery cover 216 (e.g., with the fingers) moving generally in the first linear direction 201. Thus, tactile force applied to move the portable electronic device 200 from the open to the closed positions will not serve to unlatch the battery cover 216. Consequently, however, to prevent the battery cover 216 from being unlatched unintentionally when opening the portable electronic device 200, the tactile force required to move the upper housing 202 to the open position (e.g., 2.5 Newtons) should be less than the tactile force required to move the battery cover 216 between the latched position and the unlatched position (e.g., 5 Newtons).

Referring to FIG. 15, the central rounded portion 240 of the post element 238 engages the beam element 252. The detent 258 retains the central rounded portion 240 of the post element 238 in an upper portion of the channel 256, i.e. away from the bottom corner 264, and, in cooperation with the locking tabs 232 which are now retained in the receiving slots 248, the battery cover 216 is interlocked with the lower housing 204. To get to and from the latched position, the central rounded portion 240 follows along the beam element 252, and the side rounded portions 242, 244 follow along a guiding edge of the post receiving channel 256 spaced apart from the beam element 252. The central rounded portion 240 engages and bears against the detent 258 and causes the beam element 252 to resiliently deflect laterally inwardly. In the unlatched position, the central rounded portion 240 of the post element 238 is in a lower portion of the channel 256, i.e. towards the bottom corner 264, the locking tabs 232 are now not retained in the receiving slots 248, and the battery cover 216 can be removed from the lower housing 204.

As shown, each combination of the post element 238 and beam assembly 250 may be disposed along the lateral sides of the portable electronic device 200 generally near a respective bottom corner 262, 264 of the portable electronic device 200. In this position, the post elements 238 and beam assemblies 250 are located in a natural resting position for a user's thumbs when the portable electronic device 200 is flipped over. Also, it should be appreciated that the user may be provided with tactile feedback as the central rounded portion 240 engages the detent 258, and therefore it may be possible to sense when the battery cover 216 moves to and from the latched position and is respectively interlocked with or released from the lower housing 204.

It can also be seen that the side rounded portions 242, 244 of the post element 238 take up the tolerance across the post receiving channel 256, thus reducing undesirable play between the post element 238 and the beam assembly 250.

While the above description provides examples of one or more processes or apparatuses, it will be appreciated that other processes or apparatuses may be within the scope of the accompanying claims.

We claim:

1. A portable electronic device, comprising:
   a lower housing including a battery compartment;
   an upper housing coupled to the lower housing and slidable relative thereto in a first linear direction between a closed position and an open position; and
   a battery cover adapted to engage the lower housing and move generally in the first linear direction relative to the lower housing from an unlatched position to a latched position in which the battery cover is adapted to interlock with the lower housing and enclose the battery compartment,
   wherein the battery cover is moveable relative to the lower housing in a second linear direction generally opposing the first linear direction from the latched position to the unlatched position,
   wherein the battery cover defines a planar central region;
   wherein the upper and lower housings are adapted so that a first tactile force is required to move the upper housing in the first linear direction relative to the lower housing to the open position,
   wherein the battery cover and the lower housing are adapted so that a second tactile force is required to move the battery cover in the second linear direction relative to the lower housing from the latched position to the unlatched position, and wherein the first tactile force is less than the second tactile force, wherein the battery cover comprises a raised post element that extends perpendicularly outwardly from the planar central region, and the lower housing comprises a beam assembly having a beam element, the post element and the beam assembly adapted to interlock with one another when the battery cover is in the latched position;

wherein, when moving the battery cover between the latched and unlatched positions, the post element engages and bears against the beam element, and causes the beam element to resiliently deflect laterally inwardly towards a centerline of the portable electronic device and in a direction parallel to the planar central region.

2. The device of claim 1, wherein the beam element is coplanar with the planar central region of the battery cover.

3. The device of claim 2, wherein, when moving the battery cover between the latched and unlatched positions, the post element is adapted to follow along the beam element.

4. The device of claim 1, wherein the beam element comprises a detent, and, when in the latched position, the detent is adapted to retain the post element for interlocking the battery cover and the lower housing.

5. The device of claim 1, wherein the post element comprises a central rounded portion adapted to engage the beam element.

6. The device of claim 5, wherein the post element comprises side rounded portions adjoining the central rounded portion.

7. The device of claim 6, wherein, when moving the battery cover between the latched and unlatched positions, the side rounded portions are adapted to follow along a guiding edge spaced apart from the beam element.

8. The device of claim 1, wherein the lower housing comprises first and second beam assemblies arranged generally adjacent to first and second lateral sides of the lower housing, and the battery cover comprises corresponding first and second post elements arranged generally adjacent to first and second lateral edges of the battery cover.

9. The device of claim 8, wherein, when in the latched position, the first post element and beam assembly and the second post element and beam assembly are arranged generally near a respective bottom corner of the lower housing.

10. The device of claim 8, wherein an interior surface of the battery cover comprises a plurality of locking tabs disposed generally along the first and second lateral edges, and the lower housing comprises a plurality of tab receiving slots disposed generally along the first and second lateral sides and adapted to receive and engage the locking tabs of the battery cover.

11. The device of claim 10, wherein, when in the latched position, the locking tabs retained in the receiving slots in cooperation with the post elements and the beam assemblies are adapted to interlock the battery cover and the lower housing.

* * * * *